(12) United States Patent
Holmberg

(10) Patent No.: US 6,568,956 B1
(45) Date of Patent: May 27, 2003

(54) PORTABLE ELECTRIC APPARATUS HAVING A DETACHABLE POWER SOURCE

(75) Inventor: Per Holmberg, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/505,860

(22) Filed: Feb. 17, 2000

(30) Foreign Application Priority Data

Feb. 18, 1999  (SE) ................................................ 9900573

(51) Int. Cl.[7] ................................................ H01R 3/00
(52) U.S. Cl. .................... 439/500; 439/266; 439/269.1; 439/181; 455/572; 429/97
(58) Field of Search .......................... 455/575, 90, 347, 455/572; 439/225, 500, 270, 266, 269.1, 181; 320/114; 379/433.08; 429/97

(56) References Cited

U.S. PATENT DOCUMENTS

| 5,007,859 A | | 4/1991 | Sangregory et al. |
|---|---|---|---|
| 5,092,788 A | | 3/1992 | Pristupa, Jr. et al. |
| 5,586,907 A | * | 12/1996 | Frantz et al. |
| 5,620,242 A | * | 4/1997 | Leon et al. |
| 5,697,070 A | * | 12/1997 | Liebler |
| 5,697,808 A | * | 12/1997 | Chen |
| 5,704,803 A | * | 1/1998 | Oshima et al. |
| 5,716,230 A | * | 2/1998 | Marren et al. |
| 5,980,310 A | * | 11/1999 | Bourel et al. |
| 6,171,138 B1 | * | 1/2001 | Lefebvre et al. |
| 6,227,872 B1 | * | 5/2001 | Stephenson et al. |

FOREIGN PATENT DOCUMENTS

WO          95/03642          2/1995

* cited by examiner

Primary Examiner—Daniel Hunter
Assistant Examiner—Huy D Nguyen
(74) Attorney, Agent, or Firm—Nixon & Vanderhye, PC

(57) ABSTRACT

A portable electric apparatus, such as a radio telephone, has a main apparatus unit and a detachable power source unit, such as a battery pack. The apparatus also has first and second externally operable fastening members having respective first and second connecting elements for mechanically securing and electrically connecting the main apparatus unit to the power source unit. Both the first and second fastening members must be externally actuated, before the power source unit may be mechanically detached from the main apparatus unit.

11 Claims, 2 Drawing Sheets

PORTABLE ELECTRIC APPARATUS HAVING A DETACHABLE POWER SOURCE

TECHNICAL FIELD

The present invention relates to a portable electric apparatus having a main apparatus unit and a detachable power source unit. More particularly, the present invention relates to a radio telephone having a removable rechargeable battery pack, wherein means are provided for preventing the battery pack from accidentally being detached from the radio telephone as well as for preventing the generation of a spark in an explosive environment.

BACKGROUND

In contemporary radio telephones, such as cellular or mobile telephone, the battery pack is attached to the telephone by means of mechanical fastening members, such as screws, snap-in locking members, etc. Such mechanical fastening members are only provided for securing the battery pack to the telephone; they play no part in establishing electric connection between the battery pack and the telephone for supplying electric power from the former to the latter. On the contrary, separate connecting elements are provided for establishing such electric connection. A common approach is to design the connecting elements as resilient pins, which are screwed, glued or otherwise secured to either the telephone or the battery pack and are arranged to reach electric connection with corresponding contact surfaces provided on the opposite device (telephone or battery).

The fastening members are located separately from the connecting elements. Hence, mounting holes have to be made and threaded for the fastening members as well as for the connecting elements. Furthermore, current losses at about 3% occur at each connecting element and have to be compensated for.

Consequently, for a telephone design according to the above, the production thereof is costly, time-consuming and complicated. Additionally, the connecting elements and the fastening members involve separate material costs.

An important problem is the risk of explosion or fire due to an accidental spark generation at any of the connecting elements when detaching the battery from the telephone. If for instance hydrogen gas has escaped from the battery and joined the airborne oxygen, thereby forming an explosive oxyhydrogen gas, there is an apparent risk of having an explosion due to sparking at the connecting elements. Furthermore, another inflammable gas, such as gasoline fumes at a gas station, may be ignited by such sparking and cause a dangerous explosion and/or fire.

Another disadvantage related to the prior art design described above is that the battery pack will sometimes unintentionally be detached from the telephone, when exposed to external influence, such as punches or vibrations.

SUMMARY OF THE INVENTION

It is an object of the present invention to eliminate the drawbacks described above and simplify the detachment of the battery. Furthermore, it is an object of the present invention to provide for improved safety, so that explosive or inflammable gases are prevented from exploding due to accidental sparking when detaching the battery.

In particular, the objects are achieved for a portable electric apparatus having a main apparatus unit and a detachable power source unit, by providing first and second externally operable fastening members having respective first and second connecting elements for mechanically securing and electrically connecting the main apparatus unit to the power source unit. The first and second fastening members are arranged, so that both of them must be externally actuated, by a user of the portable electric apparatus, before the power source unit may be mechanically detached from the main apparatus unit.

Because of the invention, a battery pack may be securely attached to a radio telephone by the provision of double fastening members, which have a combined function for mechanically securing the battery pack as well as electrically connecting the battery pack to the main part of the telephone. According to a preferred embodiment, the fastening members are provided with resilient engagement arms, which are movably mounted in the radio telephone at the rear surface thereof, or alternatively in the battery itself. The engagement arms are in turn connected to respective actuators, such as buttons, tilting levers etc, which must be operated simultaneously in order to release one end of the battery pack from the radio telephone, thereby allowing the battery pack to be detached from the telephone.

According to a preferred embodiment of the invention, the engagement arms are made electrically conductive by means of a respective connecting element provided at each engagement arm. The electrical power losses may be minimized, since the current will be conducted directly from the battery to the connecting elements without any intermediate contacts in the telephone. Thanks to the invention, the battery cannot be detached by only operating one of the actuators and the corresponding engagement arm, since the other engagement arm will maintain the batter in its secured position relative to the telephone. Any sparking generated, when the electrical connection is interrupted between the battery and the telephone, will not reach any possibly inflammable gas outside the battery, thanks to a seal between the battery and the telephone, which seal will fully enclose such sparking. Since both actuators must have been operated in order to detach the battery, a possible sparking will already have occurred, when the battery is detached, and consequently there is not risk of contact between an inflammable gas and a spark generated at any of the connecting elements.

The invention has an important advantage in aforesaid fastening members, which act as electric connecting elements as well as mechanical engagement arms, since assembly costs and material expenses may be reduced. As another important advantage, the battery will be mechanically secured and electrically connected to the telephone at the same positions. Furthermore, the securing arrangement will prevent accidental battery detachment due to e.g. vibrations or punches, since both fastening members must be operated, before the battery is detached.

BRIEF DESCRIPTION OF THE DRAWINGS

The invention will be described in more detail by way of a few embodiment examples, reference being made to the accompanying drawings, in which.

DETAILED DISCLOSURE

Figure 1:
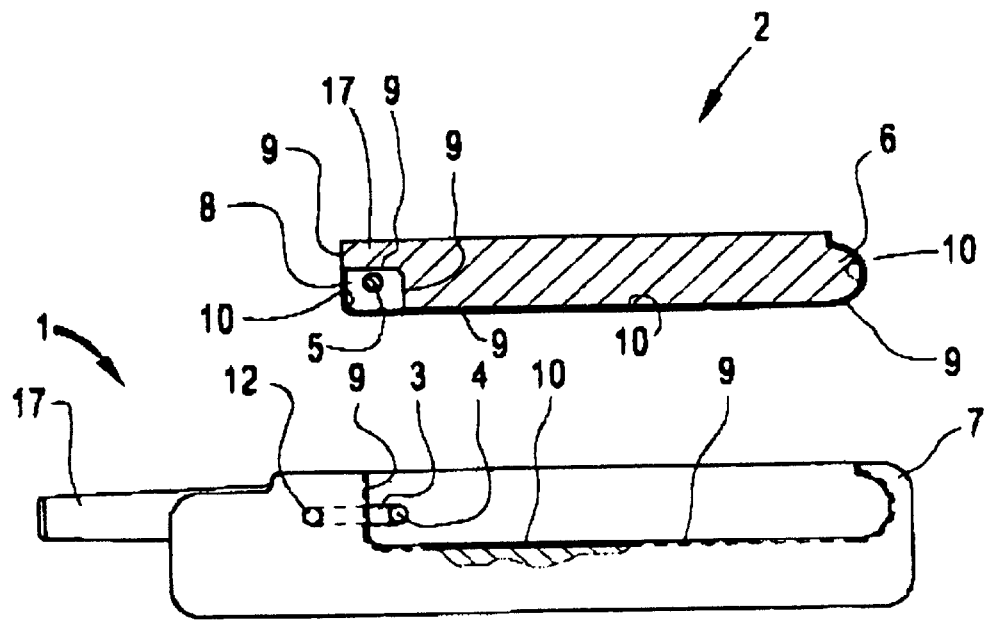
FIG. 1 is a schematical and partly cross-sectional side view of a mobile telephone having two fastening members and a battery, which is currently detached from the mobile telephone.
Figure 2:
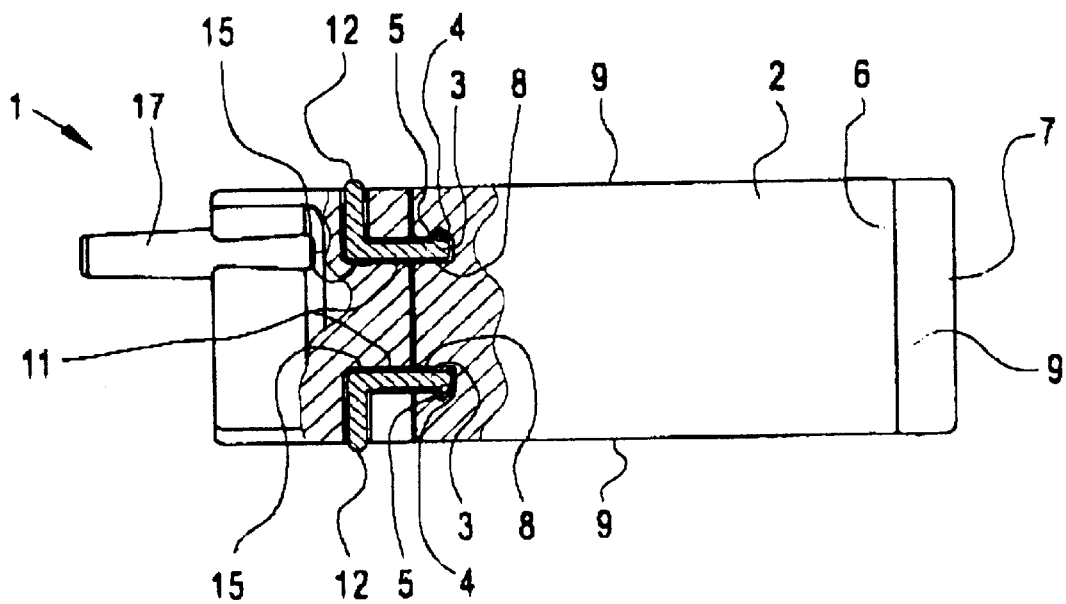
FIG. 2 is a schematical and partly sectional top view of the mobile telephone shown in FIG. 1, wherein the battery is secured to the telephone.

FIGS. 1 and 2 illustrate a first embodiment of a mobile telephone 1 according to the invention. The mobile telephone 1 comprises an external antenna 17 or an internal antenna (not shown) located inside the telephone 1. Furthermore, the mobile telephone 1 is provided with two cavities 11, in which two spring-loaded fastening members or actuators 12 are movably arranged. The fastening members comprise respective engagement arms 3, which are provided with respective connecting elements 4 for establishing electric contact with two contact surfaces 5 of a battery 2. In the situation illustrated in FIG. 1 the battery 2 is detached from the mobile telephone 1. When the battery 2 is to be attached to the mobile telephone 1, a first end 6 of the battery 2 is inserted in a recess 7 in the telephone 1, wherein the battery end 6 will be fixed to the telephone 1. Therefore, when the battery 2 is further inserted into the mobile telephone 1, the engagement arms 3 will be guided into respective recesses 8 in the battery 2, wherein the contact surfaces 5 and the connecting elements 4 will contact each other and wherein electrical contact is established between the battery 2 and the telephone 1. The connecting elements 4 are tip-shaped and are furthermore spring-loaded by a spring-back force from e.g. a resilient rubber element 15 or another resilient element, wherein the connecting elements 4 will be biased into a recess at the contact surface 5 and wherein electric contact is established and the battery 2 is mechanically secured.

A seal 10 is provided at the peripheral edges 9 of the battery 2 and/or the mobile telephone 1. The purpose of the seal is to protect the connecting elements 4 and contact surfaces 5 from any surrounding explosive gases. When the battery is attached and secured to the mobile telephone 1, as shown in FIG. 2, a fully enclosed space is formed between the telephone 1 and the battery 2. When the battery 2 is to be detached from the telephone 1 by simultaneously operating both actuators 12, sparks may accidentally be generated at the connecting elements 4. However, the battery is prevented from being detached until after such sparking has been generated, since both connecting elements 4 must already be separated from the contact surfaces 5, when the battery 2 is mechanically detached from the telephone 1. In reality, one of the connecting elements 4 will be released slightly before the other, since a human user will not be able to operate both actuators 12 at exactly the same time. Consequently, sparking will be generated at either of the connecting elements 4, which happens to be released slightly before other element 4. In other words, such possible sparking will already have occurred, before both connecting elements are released. Therefore, thanks to the provision of the seal 10, a possible spark can never reach the surrounding air.

As an alternative, the double fastening members or actuators 3, 12 may be arranged, so that they can be operated by one hand only. In such a case, the actuators 12 may protrude from the mobile telephone 1 in directions different from the ones disclosed in FIGS. 1 and 2. Furthermore, the fastening members 3, 12 may slide in channels, may be mounted in a point of rotation, may be hinged, or may be controlled through gears and/or shafts, so as to transmit motions, originating from a user of the telephone, from the actuators 12 to the engagement arms 3, in order to detach the battery 2.

According to an alternative embodiment, the actuators 12 are located in the battery 2, while the engagement arms 3 protrude into the mobile telephone 1. The recesses 8 are located inside the mobile telephone 1, whereas the cavities 11 will be located inside the battery 2. The recesses 8 may be open or sealed by a cover. In case the recesses 8 are open, they may easily be accessed for cleaning purposes. On the other hand, if the recesses 8 are sealed, they will be protected from moisture and foreign particles.

Figure 3:
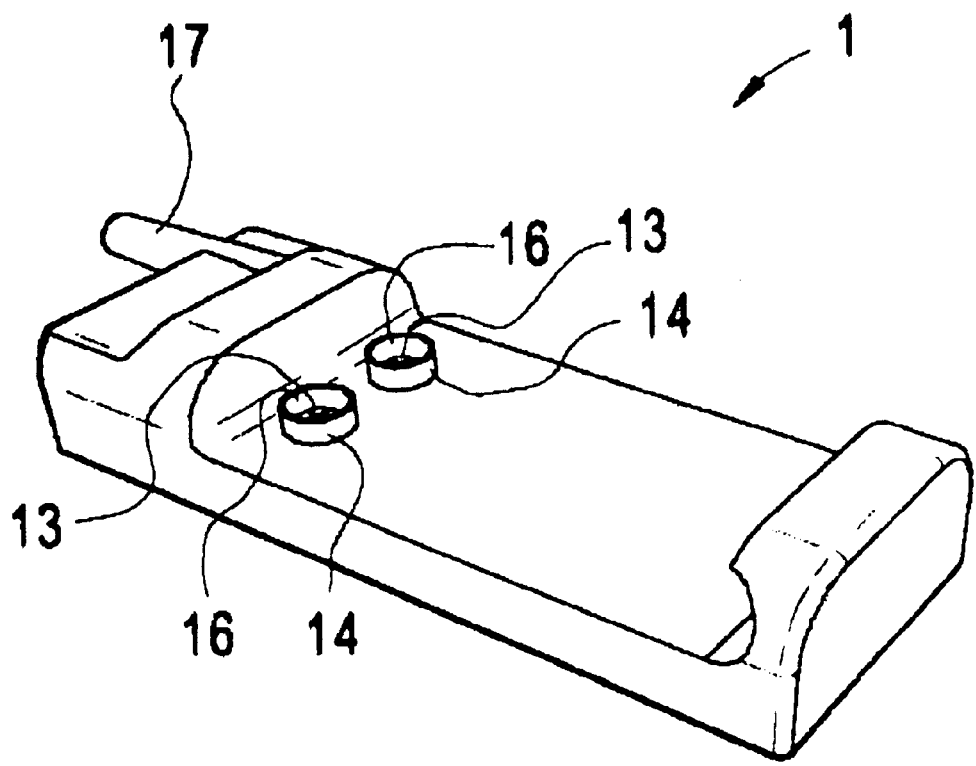
FIG. 3 is a schematic perspective view of a second embodiment of the invention.

An alternative embodiment is illustrated in FIG. 3, wherein a mobile telephone 1 is provided at a rear side thereof with connecting elements in the form of resilient pins 13, which are capable of resiliently engaging a contact surface. Hence, these or other resilient connecting elements may be used as replacement for the engagement arms 3 and the connecting elements 4 shown in FIGS. 1 and 2. The resilient pins 13 will establish contact with corresponding contact surfaces, which are located on the battery. The pins 13 are provided with at least one seal 14, which surrounds the respective pin 13 and forms a space 16. Alternatively, the seal 14 may enclose both pins 13.

In this embodiment the engagement arms 3 will only have a securing function and may be replaced by any other means for mechanical engagement, such as screw means, etc. When the battery is detached from the telephone 1, the seals 14 will follow the battery and maintain contact with the battery during its movement away from the resilient pins 13. Eventually, the contact between either of the resilient pins 13 and the corresponding contact surface will end, wherein a possible spark will be generated at the resilient pin 13 in question, which spark will be completely enclosed in the space 16 by the seal 14.

For the embodiment shown in FIG. 3, the seal 10 of FIGS. 1 and 2 is not mandatory, since an explosive gas will not be able to reach contact with a possible spark. However, operational safety may be further improved by the double seals 10, 14. In such a case, the seal 10 will protect against moisture and external mechanical particles.

Alternatively, the resilient pins 13 may be mounted on the battery 2, while the contact surfaces are located on the telephone. Furthermore, also the seals 16 may be fully or partly located on the battery. Additionally, one engagement arm 3 may be used together with two resilient pins 13 and corresponding seal 14, or alternatively one connecting element 4 may be used together with the engagement arm 3 and one resilient pin 13 with corresponding seal 10. Alternatively, the resilient pins 13 may be another type of connecting elements capable of conducting current to the contact surfaces.

The invention has been described above with reference to a few exemplifying embodiments. However, other embodiments than the ones disclosed herein are equally possible within the scope of the invention, as defined by the appended patent claims.

What is claimed is:

1. A portable electric apparatus, comprising:
    a main apparatus unit;
    a detachable power source unit; and
    first and second externally operable fastening members having respective first and second connecting elements for mechanically securing and electrically connecting the main apparatus unit to the power source unit,
    wherein both the first and the second fastening members must be externally actuated before the power source unit may be mechanically detached from the main apparatus unit.

2. An apparatus according to claim 1, further comprising a seal arranged between at least a portion of the main apparatus unit and at least a portion of the detachable power source unit.

3. An apparatus according to claim 2, wherein said seal is arranged, so that said spark will be prevented from igniting an explosive or inflammable atmosphere around the portable electric apparatus.

4. An apparatus according to claim 2, wherein the seal is provided along an edge portion of the main apparatus unit or the power source unit.

5. An apparatus according to claim 2, wherein said seal is located adjacently to one or both of said first and second connecting elements.

6. An apparatus according to claim 1, wherein the apparatus is a radio telephone, preferably a mobile or cellular telephone.

7. An apparatus according to claim 1, wherein the power source unit is a rechargeable battery pack.

8. An apparatus according to claim 1, wherein the fastening members are provided at the power source unit.

9. An apparatus according to claim 1, wherein the fastening members are arranged at the main apparatus unit.

10. A portable electric apparatus, comprising:

a main apparatus unit;

a detachable power source unit; and first and second externally operable fastening members having respective first and second connecting elements for mechanically securing and electrically connecting the main apparatus unit to the power source unit, wherein both the first and the second fastening members must be externally actuated before the power source unit may be mechanically detached from the main apparatus unit, and wherein the first and second fastening members are arranged such that a possible spark, generated at either of the first and second connecting elements when any of the first and the second fastening members is actuated, occurs before the power source unit is mechanically detached from the main apparatus unit.

11. A portable electric apparatus, comprising:

a main apparatus unit;

a detachable power source unit; and first and second externally operable fastening members having respective first and second connecting elements for mechanically securing and electrically connecting the main apparatus unit to the power source unit, wherein both the first and the second fastening members must be externally actuated before the power source unit may be mechanically detached from the main apparatus unit, and wherein each of the externally operable fastening members comprises an externally accessible actuator, a spring-loaded engagement arm, and a tip-shaped connecting element.

* * * * *